United States Patent [19]

Snow

[11] 4,292,802
[45] Oct. 6, 1981

[54] METHOD AND APPARATUS FOR INCREASING COMPRESSOR INLET PRESSURE

[75] Inventor: Barton H. Snow, Wyoming, Ohio

[73] Assignee: General Electric Company, Cincinnati, Ohio

[21] Appl. No.: 973,766

[22] Filed: Dec. 27, 1978

[51] Int. Cl.³ .............................................. F02K 3/075
[52] U.S. Cl. ..................................... 60/204; 60/226 B
[58] Field of Search .................. 60/226 B, 204, 39.14, 60/262

[56] References Cited

U.S. PATENT DOCUMENTS

| | | | |
|---|---|---|---|
| 2,873,576 | 2/1959 | Lombard | 60/226 B |
| 3,060,680 | 10/1962 | Wilde et al. | 60/226 B |
| 3,472,027 | 10/1969 | Snow et al. | 60/262 |
| 3,514,952 | 6/1970 | Schumacher et al. | 60/226 B |
| 3,779,665 | 12/1973 | Tatem et al. | 415/123 |
| 3,908,362 | 9/1975 | Szydlowski | 60/226 R |
| 4,043,121 | 9/1977 | Thomas et al. | 60/226 B |
| 4,069,661 | 1/1978 | Rundell et al. | 60/204 |
| 4,080,785 | 3/1978 | Koff et al. | 60/226 R |
| 4,175,384 | 11/1979 | Wagenknecht et al. | 60/226 B |

*Primary Examiner*—Robert E. Garrett
*Attorney, Agent, or Firm*—Dana F. Bigelow; Carl L. Silverman; Derek P. Lawrence

[57] ABSTRACT

A plurality of blocker door vanes are disposed in the bypass duct to selectively close off the bypass flow and increase the flow and pressure of the air flowing into the compressor. In this way, the compressor inlet pressure can be increased sufficiently to allow air starts without starter torque assist. The vanes may also be closed down during ground idle to reduce the thrust and increase the compressor bleed pressure and both the pressure and the temperature of the air to the combustor. Provision is made for the controlling of the blocker door vanes as a function of core speed.

5 Claims, 12 Drawing Figures

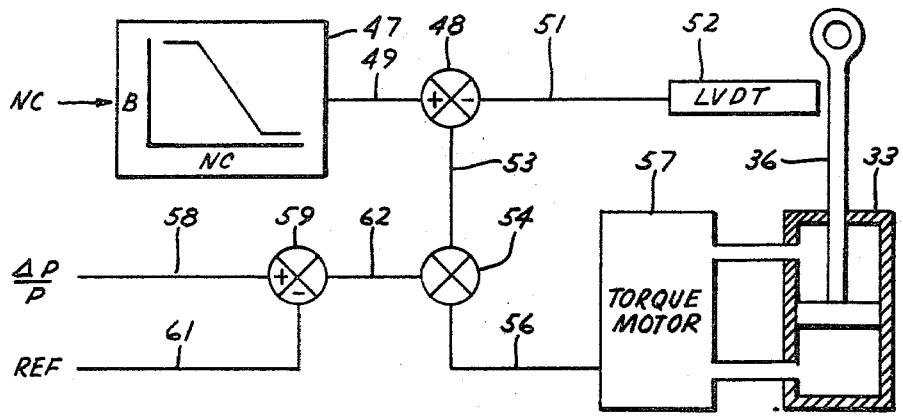
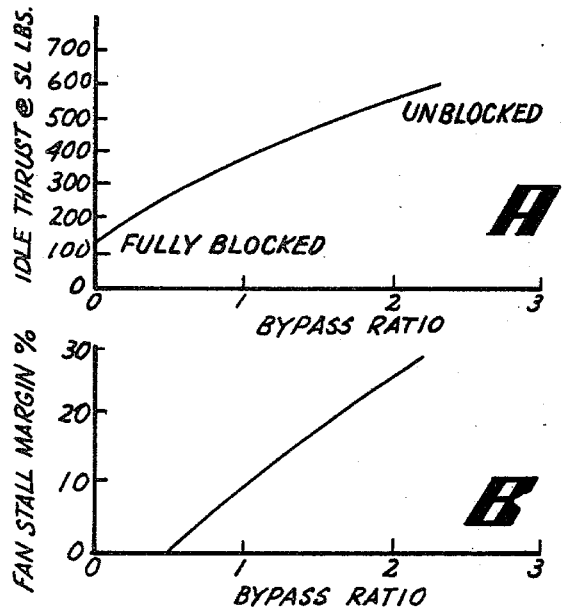
Fig 5
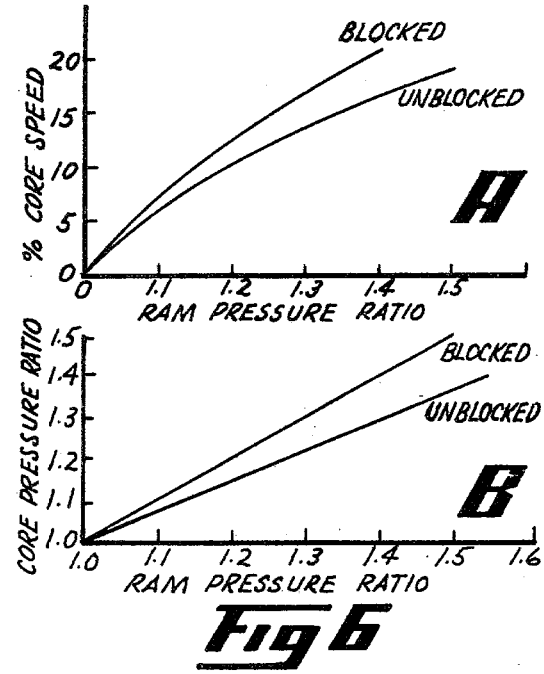
Fig 6
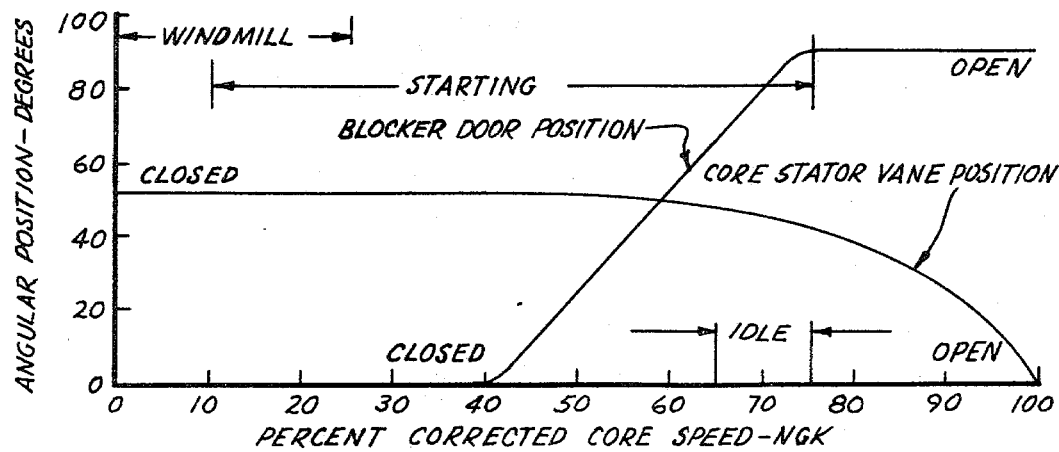
Fig 7

METHOD AND APPARATUS FOR INCREASING COMPRESSOR INLET PRESSURE

BACKGROUND OF THE INVENTION

This invention relates generally to gas turbine engines and, more particularly, to the bypass duct and compressor of a turbofan engine.

The starting of aircraft gas turbine engines can be easily accomplished by many different types of on-ground power supply systems. However, for inflight starts, which are necessitated by flame-outs, space and weight considerations make it impractical to carry such power systems aboard the aircraft. When a flame-out occurs in a turbojet engine, there is a large volume of air which passes through the compressor and the resulting windmill speed of the core engine is sufficient to support an inflight start. In the case of a turbofan engine, however, wherein a good portion of the air which enters the inlet of the engine passes around the engine core, the compressor rotor receives a smaller portion of the available ram energy and, therefore, does not attain as high a windmill speed as in the turbojet engine. This is particularly true of a mixed flow-type engine where a common nozzle allows only the duct pressure drop between the core inlet and core exit. If the windmill speed of the core is not sufficient, then an air start cannot be obtained without some kind of a starter assist. Since the ability of an engine to relight varies with altitude and forward speed of the aircraft, a starter assist may not be required over the entire flight envelop of an aircraft, but only a portion thereof, such as, for example, during a low speed flight. Various methods are used for starter assists, such as an auxiliary power unit (APU), cartridge starting, or a combustion air starter. However, the use of any of these starter assist methods is less desirable than making the engine capable of self-starting.

Other characteristics of turbofan engines relates to its operation at ground idle conditions. Because of the high mass flow through the bypass duct, the ground idle thrust is normally greater than is required for the normal taxiing purposes. Further, at these reduced core speeds, the resulting reduced pressure ratios in the compressor tend to bring about some undesirable performance characteristics. For example, at these low pressure ratios, the sump pressurization may not be sufficient to load the carbon seals such that oil leakage may result. Another characteristic is that the customer bleed pressures are reduced at these lower pressure ratios and thus become a limiting factor in determining the minimum idle speed. Another characteristic of these lower speeds is that the compressor discharge pressure and temperature are reduced so as to thereby increase the carbon monoxide emissions.

It is, therefore, an object of the present invention to provide an improved method and apparatus for assisting air starts in a turbofan engine.

Another object of the present invention is the provision in a turbofan engine for an air start assist system which can serve for more than a single purpose of starter assists.

Yet another object of the present invention is the provision in a turbofan engine for an air start assist system which is relatively light in weight, effective in use, and simple in operation.

Yet another object of the present invention is the provision in a turbofan engine for reducing the ground idle thrust level.

Still another object of the present invention is the provision in a turbofan engine for increasing the compressor pressure ratio at low core speeds.

These objects and other features and advantages become more readily apparent upon reference to the following description when taken in conjunction with the appended drawings.

SUMMARY OF THE INVENTION

Briefly, in accordance with one aspect of the invention, a blocking means is provided in the bypass duct of a turbofan engine for selectively closing off the bypass flow such that the flow to the compressor inlet is sufficient to allow an air start to the engine without any other assist.

By another aspect of the invention, the blocker means is closed down, at least partially, during ground idle conditions so as to reduce the bypass flow and thrust level to a desired low level. This reduction in bypass flow results in increased flow in the compressor to thereby increase the pressure ratio of the engine, which is desirable for purposes of higher bleed pressures and lower combustor emissions.

By yet another aspect of the invention, the blocker means comprises a plurality of circumferentially spaced vanes which offer little resistance to bypass flow when they are in their open position, and which, when they are in the closed position, engage adjacent vanes to substantially close off all flow through the bypass duct.

By yet another aspect of the invention, the bypass duct vanes are modulated in response to the core speed of the engine. When the core is not rotating, the vanes are in the completely closed position; when the core is operating at low speeds, the vanes are partially open; and when the core is at high speeds, the vanes are completely open. The schedule is preferably coordinated with that of the core variable stator vanes.

In the drawings, as hereinafter described, a preferred embodiment is depicted; however, various other modifications and alternate constructions can be made thereto without departing from the true spirit and scope of the invention.

BRIEF DESCRIPTION OF THE DRAWINGS

FIG. 4 is a schematic representation of the actuator logic portion of the invention;

FIGS. 5A and 5B are graphic representations of the idle thrust and fan stall margin, respectively, as a function of the blocker door vane positions;

FIGS. 6A and 6B are graphic representations of the core speed and pressure ratio, respectively, with the blocker door vanes open and closed under windmilling condition;

FIG. 7 is a graphic illustration of the blocker door vane angle as a function of a core stator angle.

DESCRIPTION OF THE PREFERRED EMBODIMENT

Figure 1:
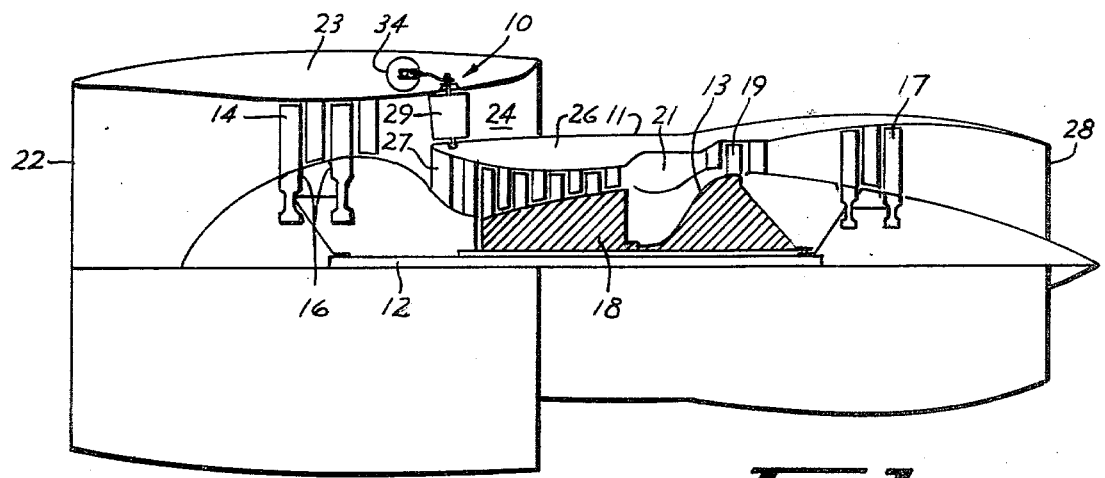
FIG. 1 is a schematic representation of a gas turbine engine in which the present invention is embodied.

Referring now to FIG. 1, the present invention is shown generally at 10 as installed in a turbofan engine 11 having a fan rotor 12 and a core engine rotor 13. The fan rotor 12 includes a plurality of fan blades 14 mounted for rotation on a disc 16 and a low pressure or fan turbine 17 which drives the fan disc 16 in a well known manner. The core engine rotor 13 includes a compressor 18 and a high pressure turbine 19 which drives the compressor 18. The core engine also includes a combustion system 21 which combines fuel with airflow and ignites the mixture to inject thermal energy into the system.

In operation, air enters the gas turbine engine 11 through an air inlet 22 provided by means of a suitable cowling or nacelle 23 which surrounds the fan blades 14. Air entering the inlet 22 is compressed by means of the rotation of the fan blades 14 and thereafter is split between an annular passageway 24, defined by the nacelle 23 and a core casing 26, and the core engine passageway 27, having its external boundary defined by the core casing 26. The pressurized air which enters the core engine passageway 27 is further pressurized by means of the compressor 18 and thereafter is ignited along with high energy fuel from the combustion system 21. This highly energized gas stream then flows through the high pressure turbine 19 to drive the compressor 18 and thereafter through the fan turbine 17 to drive the fan rotor disc 16. Gas is then passed out the main nozzle 28 to provide propulsion forces to the engine in a manner well known in the art. The primary propulsive force, however, is obtained by the exhaust of the pressurized air from the annular passageway 24.

Figure 8:
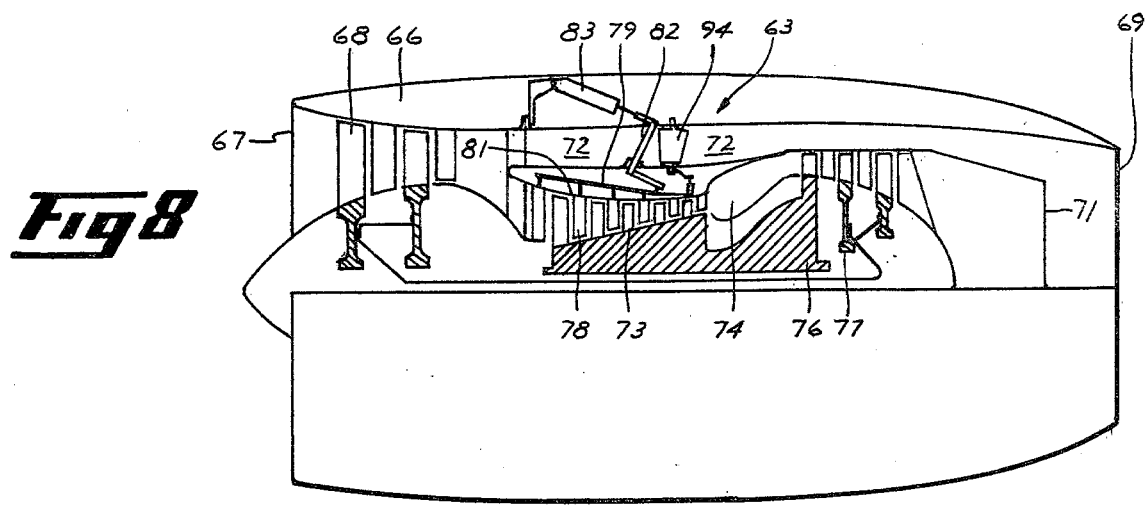
FIG. 8 is a schematic representation of a modified embodiment of the invention.

It should be recognized that, although the turbofan 11 is depicted as having a short cowl or nacelle 23, it may very well have a long duct nacelle which extends aft to the main nozzle, as shown in FIG. 8, or it may be of the mixed flow type wherein a mixer is provided to combine the gas stream flow from the fan duct annular passageway 24 and that from the core engine, to exhaust from a single nozzle.

Assume now that the present turbofan engine, during inflight operation, suffers a flame-out such as may occur by a malfunction of the fuel system or from the compressor stall condition wherein the air supplied to the combustor is drastically distrupted. Since the flow of combustion gases to the turbines 19 and 17 will discontinue, the driving power to the compressor 18 and the fan rotor 12 will be removed and they will accordingly coast down in rotational speed. However, since the forward speed of the aircraft will cause the air to continue to flow through the passageways 24 and 27, both the fan rotor 12 and the core engine rotor 13 will continue to rotate because of the well known windmill effect. The rotational speed of the core engine rotor is dependent upon the pressure ratio across the core rotor. Under windmilling conditions the pressure ratio is low, and the fan discharge pressure is lower than engine inlet pressure. During certain operational conditions as, for example, at high flight speeds, the pressure ratio across the core engine will be sufficient to windmill the rotor to a speed which will allow a relight of the engine, but there will be other periods of operation during which this rotational windmill speed will not be sufficient to support combustion for a relight. The present invention is designed for use during such periods and is also adapted for dual purpose use during other periods of operation.

Disposed in the annular passageway 24, are a plurality of circumferentially spaced blocker door vanes 29 which extend radially between the outer casing or nacelle 23 and the engine casing 26. The vanes 29 are selectively pivotable on their radial extending axes such that they can be moved from a fully opened condition, wherein the bypass air is allowed to flow with very little restriction, to a fully closed position, wherein there is substantially no flow in the bypass duct 24. Selective intermediate positions can be used to bring about certain desired engine performance characteristics.

Figure 2:
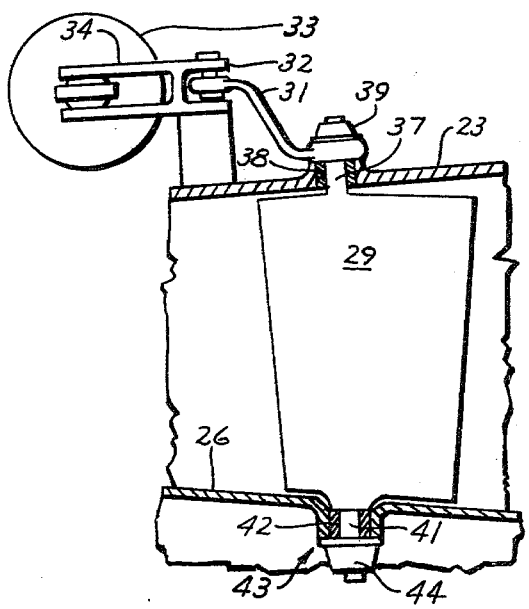
FIG. 2 is a partial longitudinal view of the blocker door vane and actuator portion of the invention.
Figure 3:
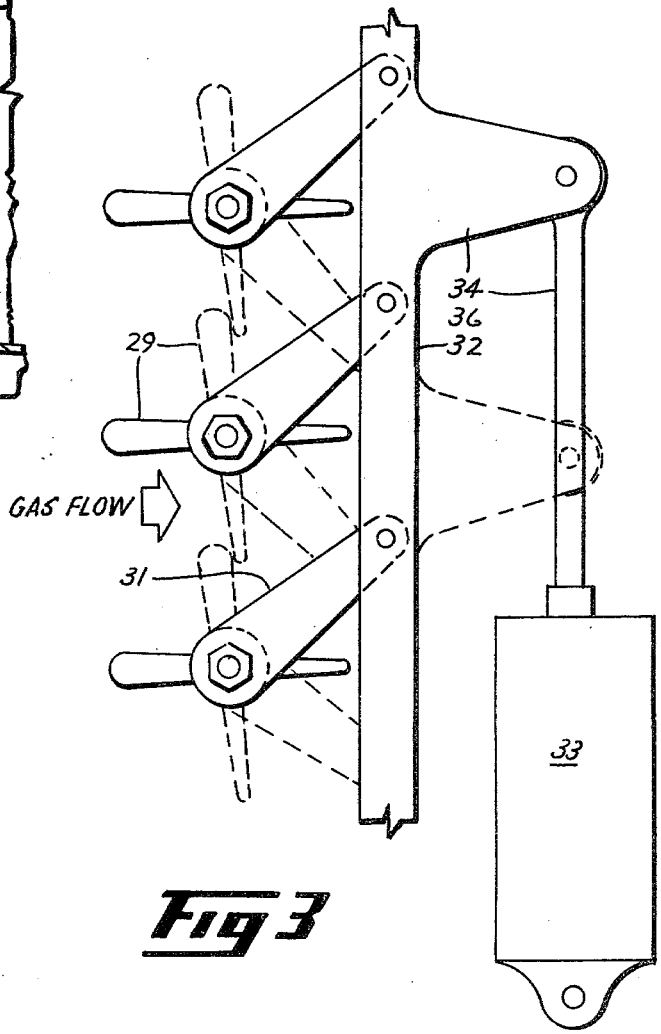
FIG. 3 is a plan view thereof.

Referring now to FIGS. 1, 2, and 3, the blocker door vanes 29 and the associated actuator system are shown in greater detail to include the plurality of vanes 29 with each one having a vane lever arm 31 which is connected to an actuator ring 32 which, in turn, is selectively rotated by an actuator 33. The actuators 33, which may be, for example, of the hydraulic type, are connected by way of bosses 34 to the actuation ring 32 in such a manner that when the actuator rods 36 are translated, the actuator ring 32 is rotated within the nacelle 23. This rotation causes the lever arms 31 to move from the solid line positions, shown in FIG. 3, wherein the vanes 29 are in the fully opened position, as shown, to the positions indicated by the dotted lines, wherein the blocker vanes are in the closed positions of mutual engagement with adjacent vanes as shown. The vanes 29 are secured at their outer ends to the respective lever arms by way of a shaft 37, which passes through a hole 38 in the skin of the nacelle 23, and a nut 39. Connection of the shaft 37 to the lever arm 31 must, of course, be made in such a way that there is no relative rotational movement as, for example, by use of a key, or the like. The inner ends of the blocker door vanes 29 have a short spindle 41 which extends into a bushing 42 which, in turn, fits into a hole 43 in the engine casing 26. A fastener 44 is secured on the end of the spindle 41.

One of the primary uses of the blocker door vanes is to accommodate air starts when the operating conditions are such that there is not sufficient windmilling speed of the compressor to allow air starts without auxiliary assist techniques. Assuming that an engine flame-out has occurred, a control system, which may be manually operated by the pilot or which may automatically come into play by the existance of certain operating conditions, will move the actuators in such a way as to completely close the blocker door vanes, as shown in FIG. 3. This substantially complete blockage of the bypass flow will increase the fan discharge pressure to thereby increase the pressure ratio across the core engine and thereby produce turbojet windmill start conditions. As the start progresses, the vanes will be allowed to open and, when the engine is fully started and has reached a predetermined speed, the vanes will then be moved to the completely open position, as shown by the solid lines of FIG. 3. At lower operating speeds, such as at ground idle, the blocker vanes will be moved to an intermediate position so as to block only a portion of the bypass flow. For example, at ground idle the vanes might be moved to a position wherein they would block most of the bypass flow. This blockage might result in a typical reduction of thrust on the order of 65% while leaving at least 10% fan stall margin, it being understood that full blockage at idle would result in fan stall. It is understood though, that at low speeds an engine can be operated continuously in full fan stall.

Other advantages that would result from the partial blockage at ground idle speeds would include the increase in pressure of the customer bleed air, increased pressures at the engine sumps so as to better load and make more efficient the carbon seals, and an increase in pressure and the temperature of the compressor discharge air to thereby decrease the carbon monoxide emissions from the combustor. Further, the vanes might be partially closed down during decelerations to improve negative thrust response as might be required during approach power operation.

Control of the actuators 33 may be accomplished by any of various hydraulic, pneumatic or electronic systems. One such system is shown in FIG. 4, wherein as a function of core speed Nc, a schedule 47 is generated to present to a summer 48, along line 49, a signal representative of the desired actuator position B. At the same time, a signal is received by the summer 48 along the line 51 from a linear variable displacement transformer (LVDT), which is representative of the actual position of the actuator piston 50. The two signals are then algebraically summed at the summer 48 and the resultant signal is made to flow along line 53 to the summer 54. The summer 54 may then pass the signal along line 56 to a torque motor 57 which operates hydraulically to move the actuator piston 50 to the desired position, as indicated by the signal on line 49.

As mentioned hereinabove, a closing down of the blocker door vanes tends to reduce the fan stall margin and it may back pressure the fan to the extent that the fan will stall. Accordingly, it is desirable to have a safety feature included in the control circuitry such that the signal along line 53 will be limited to the extent that it will not allow the torque motor to move the actuator to the point where it would cause a fan stall. A sensor is therefore provided to sense the pressure ratio, $\Delta P/P$, at the fan discharge, and the resultant signal is sent along line 58 to a summer 59. Simultaneously, a reference signal, representative of the desired fan stall margin, is sent along line 61 to the summer 59 and the results of the algebraic summation is passed along line 62 to the summer 48 to bring about the required limiting function as described hereinabove.

Referring now to FIGS. 5A and 5B, it will be recognized that the idle thrust level can be substantially reduced when the blocker vanes are modulated from the unblocked to the fully blocked position. However, it will also be seen that if the vanes are moved completely or near to the fully blocked position, the fan stall margin will reduce to zero and fan stall will result. Accordingly, the graph of 5B will be applied to derive a signal which, based on the desired fan stall margin, will limit the amount of vane blockage in accordance with the existing bypass ratio at the fan discharge point.

Considering now the effect that the blocking vanes have on the performance of the core under windmill conditions, FIGS. 6A and 6B show the core speed and core pressure ratio, respectively, as the vanes are varied between the blocked and unblocked vane positions. It will be recognized that the higher the ram pressure ratio, or the flight speed, the greater the difference that is caused by a closing of the blocking vanes. However, even at a very low ram pressure ratio of 1.08, by use of the blocker doors the core speed may be increased by 2–3% and the core pressure ratio can be increased from 1.05 to 1.08. This difference is enough to allow an unassisted air start, which otherwise might not be possible.

As mentioned hereinabove, during air starts, it is desirable to have the blocker vanes completely closed, and during ground idle, it is desired to have the vanes partially closed. It should also be kept in mind that a modulation of the vanes may be integrated with the engine control to provide improved thrust response. Accordingly, it is preferred that the schedule of the blocker vanes is such that the vanes are gradually opened as the speed of the engine increases. Since this is also true of the variable stator vane schedule, it is desirable that the schedule of the blocker vanes be responsive to the schedule of the core stator vanes. Such a relationship is shown in the graph of FIG. 7 wherein the variable stator vanes are modulated through a 52 degree range from the "closed" position to the "open" position, whereas the blocker vanes are modulated through a 90 degree range from the fully closed to a fully open position when the core speed is increased from 40 to 75% of corrected core speed, NGK. Such a schedule relationship can be maintained by providing a mechanical linkage arrangement between the actuation system of the variable stator vanes and the actuation system of the variable angle blocker doors. One embodiment of such a mechanical linkage is shown in FIGS. 8, 9, and 10.

Referring to FIG. 8, the mechanical linkage is shown generally at 63 as installed in a turbofan engine having a so-called long duct nacelle 66, which extends from the inlet 67 forward of the fan 68 to the point of an exhaust nozzle 69 downstream of the core nozzle 71. The nacelle 66 surrounds the bypass duct 72 which, in turn, surrounds the serially connected compressor 73, combustor 74, high pressure turbine 76, and low pressure turbine 77. The compressor 73 includes variable pitch stator vanes 78 and an associated rotation mechanism 79 located on the core inner casing 81. The rotation mechanism 79 may be any of various types such as that shown in U.S. Pat. No. 3,487,992 for selectively rotating the vanes 78 according to a predetermined schedule. In accordance with the present invention, mechanical input into the rotation mechanism 79 is accomplished by way of a plurality of shafts 82 extending from the rotation mechanism 79 radially outward through the bypass duct 72 and into the nacelle 66 where each one is connected to a linear actuator 83 which operates in accordance with a predetermined schedule.

Figure 9:
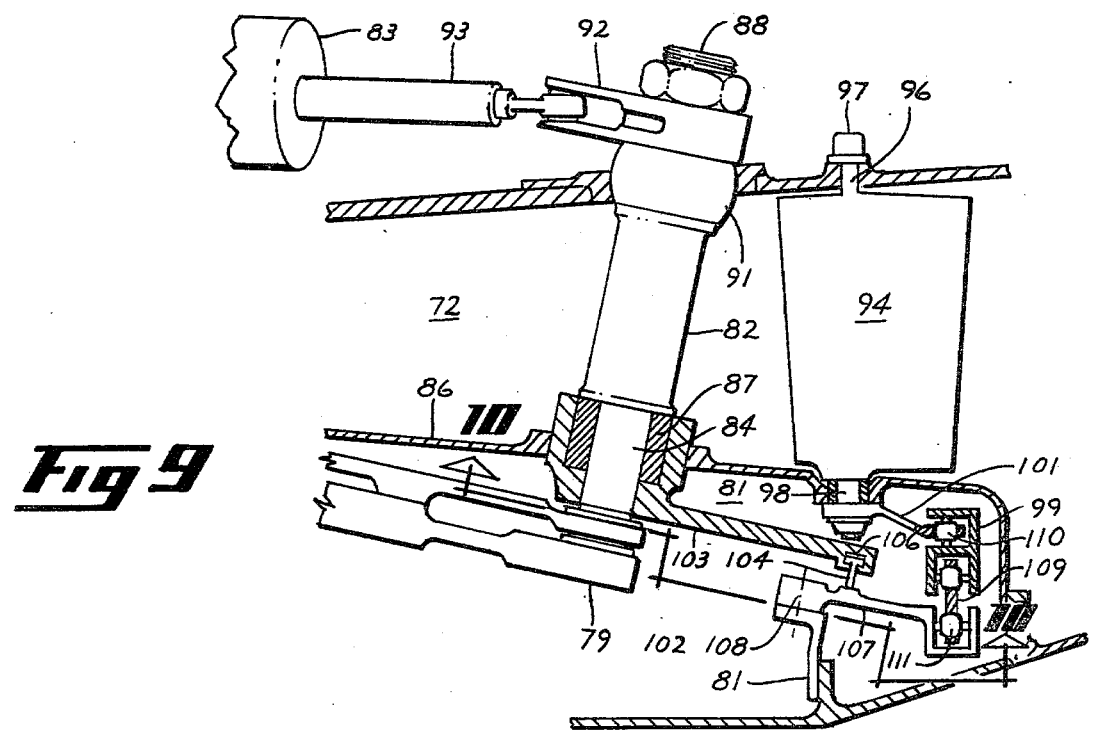
FIG. 9 is an expanded sectional view of the blocker door vane and actuator portion thereof.
Figure 10:
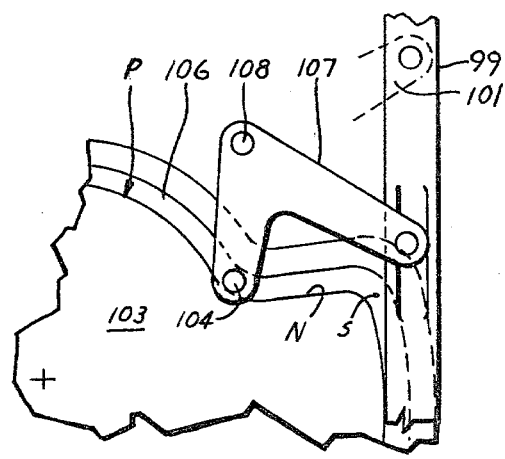
FIG. 10 is a partial plan view of the cam and linkage portion thereof, as seen along lines 10—10 of FIG. 9.

For a more detailed description, reference is made to FIG. 9 wherein the shaft 82 is shown to extend through the bypass duct 72 with its inner end 84 passing through the inner duct wall 86 of the inner casing 81 and being secured to the rotation mechanism 79 mounted on the core case 81. A bushing 87 is provided between the shaft inner end 84 and the wall 86 to fix the position of the inner end 84 while allowing selective rotation of the shaft 82. The shaft 82 extends at its outer end 88 through the duct outer wall 89 and is rotatably secured therein by a uniball bushing 91. A clevis 92 interconnects the shaft outer end 88 to the piston rod 93 of the linear actuator 83 to rotate the shaft 82 in response to linear movement of the piston rod 93.

Extending between the casing wall 86 and the duct outer wall 89, at an axial point surrounding the compressor 73, is a plurality of circumferentially spaced blocker doors 94 each of which is held at its outer end by a stem 96 passing through the duct outer wall 89 and secured by a fastening device 97 and, at its inner end, by a stem 98 which is secured in the casing wall 86 by a suitable means such as a bushing, or the like. The blocker door vanes 94 are connected to an actuator ring 99 by a plurality of lever arms 101 in a manner similar to that as shown in FIG. 3. However, instead of being moved directly by the actuator, as in the FIG. 3 embodiment, the actuator ring 99 is moved in response to rotation of the shaft 82 by the linkage means shown generally at 102.

The linkage means 102 includes a two-dimensional cam 103 which is securely attached and rotated about its center by the shaft 82. A cam follower 104, which is attached to the cam 103 so as to move within a groove 106 as the cam 103 is rotated, is attached to a bellcrank 107 which is rotatably secured to a stationary pivot 108 mounted on the core casing 81. The other end of the bellcrank 107 is attached to the actuator ring 99 by way of a drag link 109 which acts to transmit the rotational movement of the bellcrank 107 to the actuator ring 99 while allowing for the axial movement of the bellcrank 107 with respect to the actuator ring 99. The drag link 109 is connected to the bellcrank 107 by a uniball connection 111 on its one end and to the actuator ring 99 by another uniball connection 110 at its other end. The uniball structures accommodate the axial movement which necessarily results in the linkage when the cam 107 is rotated.

In describing the operation of the cam 103 and linkage means 102, reference is made to FIGS. 7 and 10. At engine operational speeds below 40% of the corrected core speed, the actuator 83 and the shaft 82 do not move and both the variable stator vanes 78 and the blocker door vanes 94 remain in the closed positions. During this period, the cam follower 104 will be positioned substantially at the point S on the cam 103. This position results in maximum enhancement of engine start capability. During operation between 40 and 75% corrected core speed, the shaft 82 will be rotated by the actuator 83 and the variable stator vanes 78 will be rotated in accordance with the schedule of FIG. 7. While the engine is operating within this range, the cam follower 104 will follow the cam surface N and will remain between the point S and the position as shown in the groove 106 such that the position of the blocker door vanes 94 follow the schedule as shown in FIG. 7. At operational speeds above 75% corrected core speed, the shaft 82 will continue to rotate such that the position of the variable stator vanes 78 will follow the schedule indicated in FIG. 7, and the cam 103 will rotate such that the cam follower 104 will follow the so-called "maximum power flat," designated by the letter P in FIG. 10, such that the blocker door vanes 94 remain in the fully open position, as indicated in FIG. 7.

When the engine is shut down, both the core stators and the blocker door vanes are in the closed position.

As the engine starts, more of the air passes through the core, thus allowing more fuel to be injected and thereby causing faster acceleration. When the core speed reaches 40%, the blocker doors begin to open and the fan discharge air begins to flow in the bypass duct. When the engine reaches the idle speed range, the blocker door vanes will be about halfway open so that the bypass flow and resulting thrust is maintained at a reduced level. In addition to reducing thrust, this reduction in bypass flow results in increased pressure to the compressor to thereby increase the pressure ratio of the engine. This results in desirable increases in bleed pressures and decreases in combustor emissions.

As the speed is then increased, the blocker door vanes are farther opened until, at approximately 75% corrected core speed, they are completely open and the full bypass flow and thrust is obtained for all operation above that speed. If the engine then has a flame-out, the core speed will reduce and the blocker door vanes will close down entirely to block off substantially all of the bypass flow. The resulting increase in pressure at the compressor inlet will cause the compressor to windmill to a sufficient speed to allow an air start, and the engine will accelerate with the blocker doors opening according to the schedule of FIG. 7.

It will be understood that the invention has been described to include various details which could be changed or eliminated without detracting from the inventive concept as contemplated. For example, although the operation of the blocker door vanes has been described in terms of a specific schedule, this schedule can be modified to meet the particular operational needs of the application.

Having thus described the invention, what is claimed as new and useful and desired to be secured by Letters Patent is:

1. A method of facilitating air starts in a turbofan engine of the type having a core, a fan, and a bypass duct, comprising the steps of:
   (a) blocking the flow of air in the bypass duct; and
   (b) increasing the inlet pressure to the compressor to a level which will allow an air start.

2. A method, as set forth in claim 1, wherein the step of blocking is accomplished by closing a plurality of circumferentially spaced vanes in the bypass duct.

3. A method, as set forth in claim 1, wherein substantially all airflow in the bypass duct is blocked.

4. A method, as set forth in claim 1, and including the step of starting the engine.

5. A method, as set forth in claim 4, and including the step of opening the bypass duct to the flow of air after the engine is started.

* * * * *